(12) United States Patent
Hsiao

(10) Patent No.: US 6,408,789 B1
(45) Date of Patent: Jun. 25, 2002

(54) REPELLING DEVICE FOR BIRD FEEDER

(75) Inventor: Feng-Shen Hsiao, Taipei (TW)

(73) Assignee: Rite-Tech Industrial Co., Ltd., Taipei (TW)

( * ) Notice: Subject to any disclaimer, the term of this patent is extended or adjusted under 35 U.S.C. 154(b) by 0 days.

(21) Appl. No.: 10/039,145

(22) Filed: Jan. 4, 2002

(51) Int. Cl.⁷ .............................................. A01K 39/00
(52) U.S. Cl. ...................................................... 119/57.9
(58) Field of Search .............................. 119/57.8, 57.9, 119/52.2, 52.3, 52.4, 428, 429, 433, 435, 459

(56) References Cited

U.S. PATENT DOCUMENTS 2,856,898 A * 10/1958 Doubleday et al.
5,868,101 A * 2/1999 Marshall ...................... 119/428
6,119,627 A * 9/2000 Banyas et al. ............. 119/57.9
6,341,576 B1 * 1/2002 Cathell et al. ............. 119/52.3

* cited by examiner

Primary Examiner—Thomas Price
(74) Attorney, Agent, or Firm—Thomas, Kayden, Horstemeyer & Risley LLP

(57) ABSTRACT

A repelling device for a bird feeder has a repelling disk rotatably and movably mounted around the central shaft and having an annular extension mounted around the central shaft of the retainer and an annular flange integrally formed on an inner face of the repelling disk and extending downward. A housing is securely engaged with the central shaft to receive therein a driving device to selectively drive the repelling disk to rotate. Multiple sensors each is securely mounted in the housing and partially extends out of the housing to be detachably engaged with the annular flange.

7 Claims, 4 Drawing Sheets

REPELLING DEVICE FOR BIRD FEEDER

BACKGROUND OF THE INVENTION

1. Field of the Invention

The present invention relates to a repelling device for a bird feeder, and more particularly to a repelling device mounted on top of a bird feeder. The repelling device has a motor shaft extending out from a motor and provided with a first bevel gear on a free end of the motor shaft to mesh a second bevel gear securely mounted on a repelling disk which is detachably connected to a container with grains. The repelling device further has a spring mounted between the repelling disk and a housing for the motor to keep the repelling disk from engaging with the housing. Therefore, when rodent or animals with large sizes are on the repelling disk, the inclination of the repelling disk triggers the motor to rotate, which in turn drives the repelling disk to rotate and then scares the unwanted animals off.

2. Description of Related Art

Different designs of feeders have been invented to the market for different animals and purposes. All these feeders have one thing in common, that is each of these feeders is designed only for a specific animal, e.g., dog feeders are for dogs and not suitable for cats and birds and bird feeders are for birds and not suitable for animals other than birds. However, some animals are fed with the same food as birds consumes, therefore, sometimes it is quite usual to see animals invade the bird feeders to steal the food from the bird feeder. A U.S. Pat. No. 6,119,627 ('627) to prevent other animal to invade the bird feeder was issued to Banyas, et. al. on Sep. 19, 2000, which discloses a bird feeder including an annular perch and an electrical motor geared to the perch so that when a rodent of excessive weight alights upon the perch the motor is pulled against a resistance spring and a switch is caused to close, thereby engaging the motor which rotates the perch to dislodge the rodent therefrom. The '627 patent motor is energized only when a rodent or unwanted animals alight on the perch. It is then asserted that the electrical motor will have to drive the entire perch to have a reciprocal movement. Not only is the power consumption to drive the entire perch to move huge, which causes frequent replacement to the power source, coupling means is also required to secure the food container to the motor housing. According to the foregoing description, the '627 patent is bulky and consumes a large electricity.

To overcome the shortcomings, the present invention tends to provide an improved repelling device to mitigate and obviate the aforementioned problems.

SUMMARY OF THE INVENTION

The primary objective of the present invention is to provide an improved repelling device for a bird feeder. The repelling device is light weight so that the electrical motor requires little power to drive the repelling disk to rotate, which enables the repelling device to have longer life period than the conventional one.

Another objective of the present invention is to provide a repelling device with a repelling disk mounted on top of the food container and driven by the electrical motor so that no animal is able to rest on the repelling disk and only birds can access the food in the food container when flying in the air.

In order to accomplish the foregoing objective, the repelling device has a motor shaft extending out from an electrical motor and provided with a first bevel gear on a free end of the motor shaft to mesh a second bevel gear securely mounted on a repelling disk which is detachably connected to a food container with grains. The repelling device further has a spring mounted between the repelling disk and a housing for the electrical motor to keep the repelling disk from engaging with the housing and the balance of the repelling disk with respect to the housing. Therefore, when rodent or animals with excessive sizes or weights are on the repelling disk, the inclination of the repelling disk triggers the electrical motor to rotate, which in turn drives the repelling disk to rotate and then scares the unwanted animals off.

Other objects, advantages and novel features of the invention will become more apparent from the following detailed description when taken in conjunction with the accompanying drawings.

DETAILED DESCRIPTION OF THE PREFERRED EMBODIMENT

Figure 1:
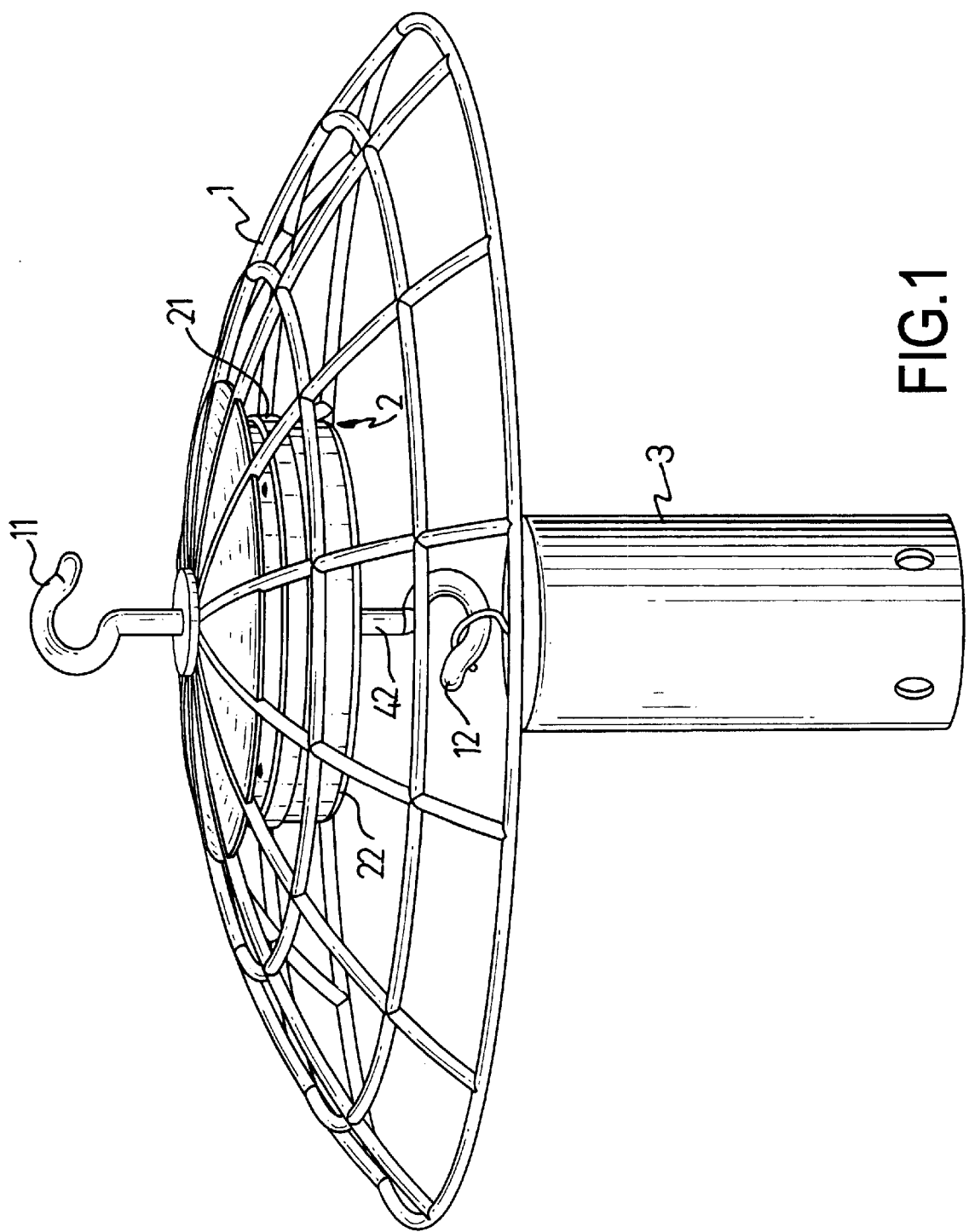
FIG. 1 is a perspective view of the repelling device in accordance with the present invention, wherein for clarity purpose, the container for receiving food is attached to the bottom of the repelling device.

With reference to FIG. 1, the repelling device in accordance with the present invention has a repelling disk (1), a housing (2) and a food container (3).

The repelling disk (1) has a bowl-like configuration with an open end facing downward to the food container (3). A top retainer (11) is connected to a top of the repelling disk (1) so that the repelling device is able to be hung on any appropriate object i.e., a twig. A bottom retainer (12) integrally formed with the top retainer (11) is connected to a bottom of the housing (2) which is securely connected to a bottom of the repelling disk (1) so that the repelling disk (1) together with the housing (2) able to be detachably connected to the food container (3).

Figure 2:
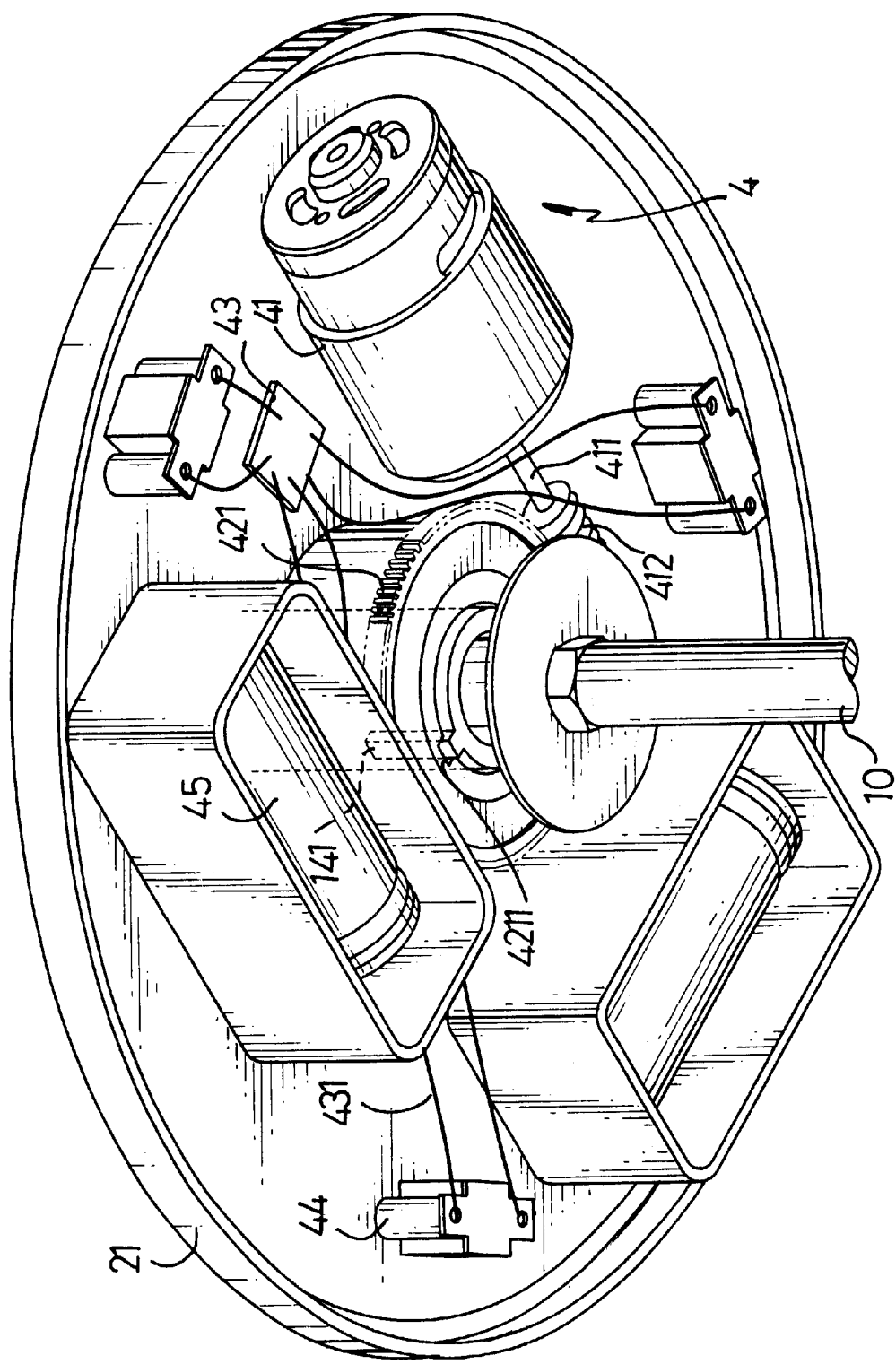
FIG. 2 is a perspective view of the repelling device from a bottom angle, wherein the bottom cap is removed to clearly show the interior structure of the housing.
Figure 3:
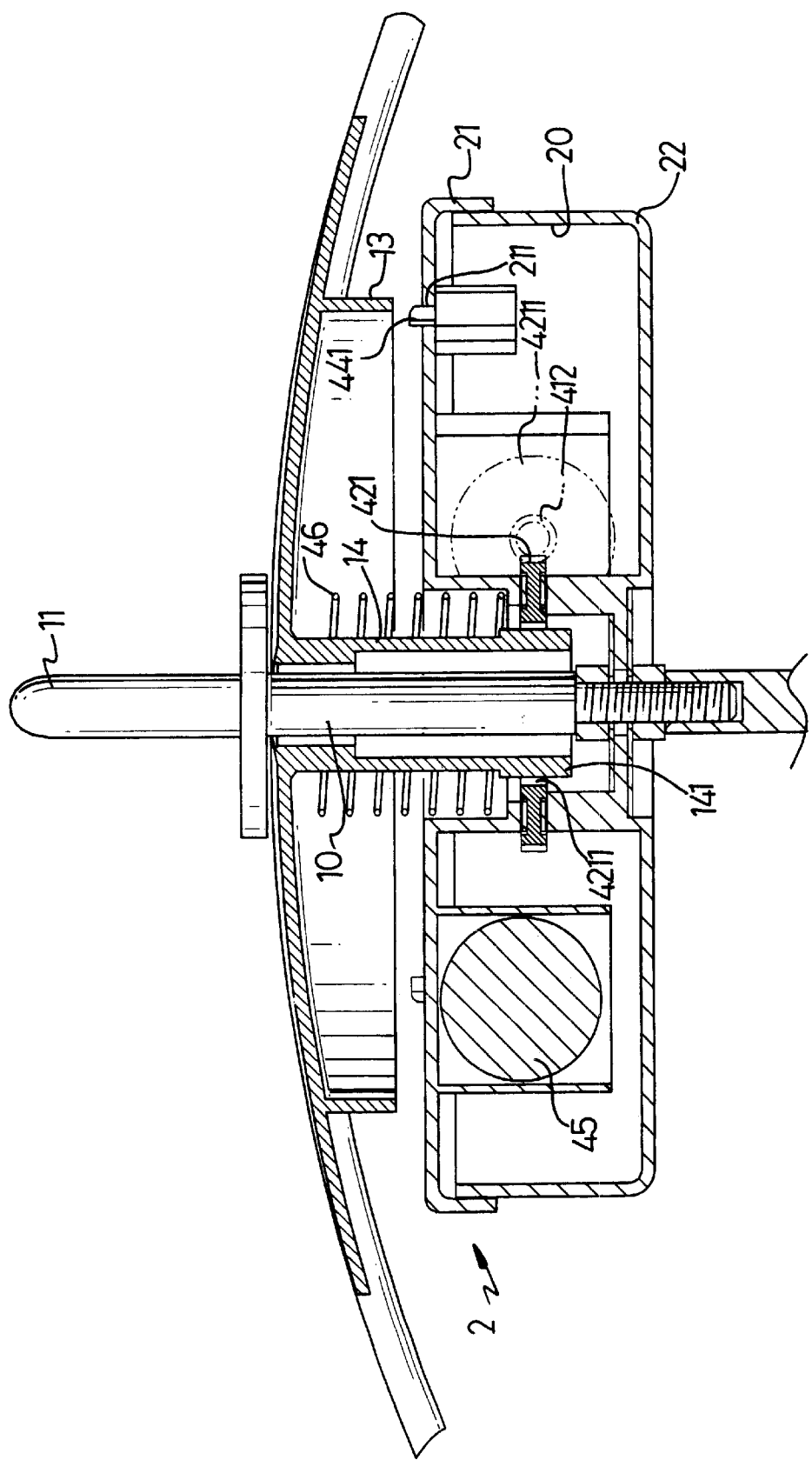
FIG. 3 is a cross sectional view of the repelling device in FIG. 1.

With reference to FIGS. 2 and 3 and still taking FIG. 1 for reference, the housing (2) has a top cap (21) and a bottom cap (22) together with the top cap (21) to form a chamber (20) in the housing (2). Within the housing (2), a driving device (4) is provided and has an electrical motor (41) with a motor shaft (411) extending out from the electrical motor (41). A first bevel gear (412) is formed on a free end of the motor shaft (411). A central shaft (10) connecting the top and bottom retainers (11,12) extends through the repelling disk (1) and the housing (2) and has a second bevel gear (421) provided outside the central shaft (10) to mesh the first bevel gear (412). It is to be noted that the repelling disk (1) has an annular extension (14) integrally formed and extending downward. The annular extension (14) has a pair of lugs (141) formed on an outer face of a free end of the annular extension (14) to be received in a correspondingly defined path (4211) defined in an inner face of the annular bevel gear (421) so as that the repelling disk (1) is able to be rotated with respect to the top retainer (11) and the central shaft (10) by the rotation of the first bevel gear (412).

A controller (43), such as an integrated circuit board as shown in this embodiment, is securely provided inside the housing (2) and has wires (431) extending out to respectively and electrically connect to each of sensors (44) that are also securely provided inside the housing (2). Batteries (45) are also mounted inside the housing (2) to provide the electricity to the electrical motor (41). It is to be noted that the repelling disk (1) has an annular flange (13) formed on an bottom face of the repelling disk (1) and extending out toward the housing (2). The top cap (21) has through holes (211) defined to correspond to buttons (441) of the sensors (44). That is, each of the through holes (211) corresponds to a corresponding one of the buttons (441) of the sensors (44) so that the buttons (441) are able to extend through the through holes (211). Furthermore, a spring (46) is sandwiched between the housing (2) and the repelling disk (1) to support the weight of the repelling disk (1). Therefore, the repelling disk (1) is kept away from engagement with the housing (2).

Figure 4:
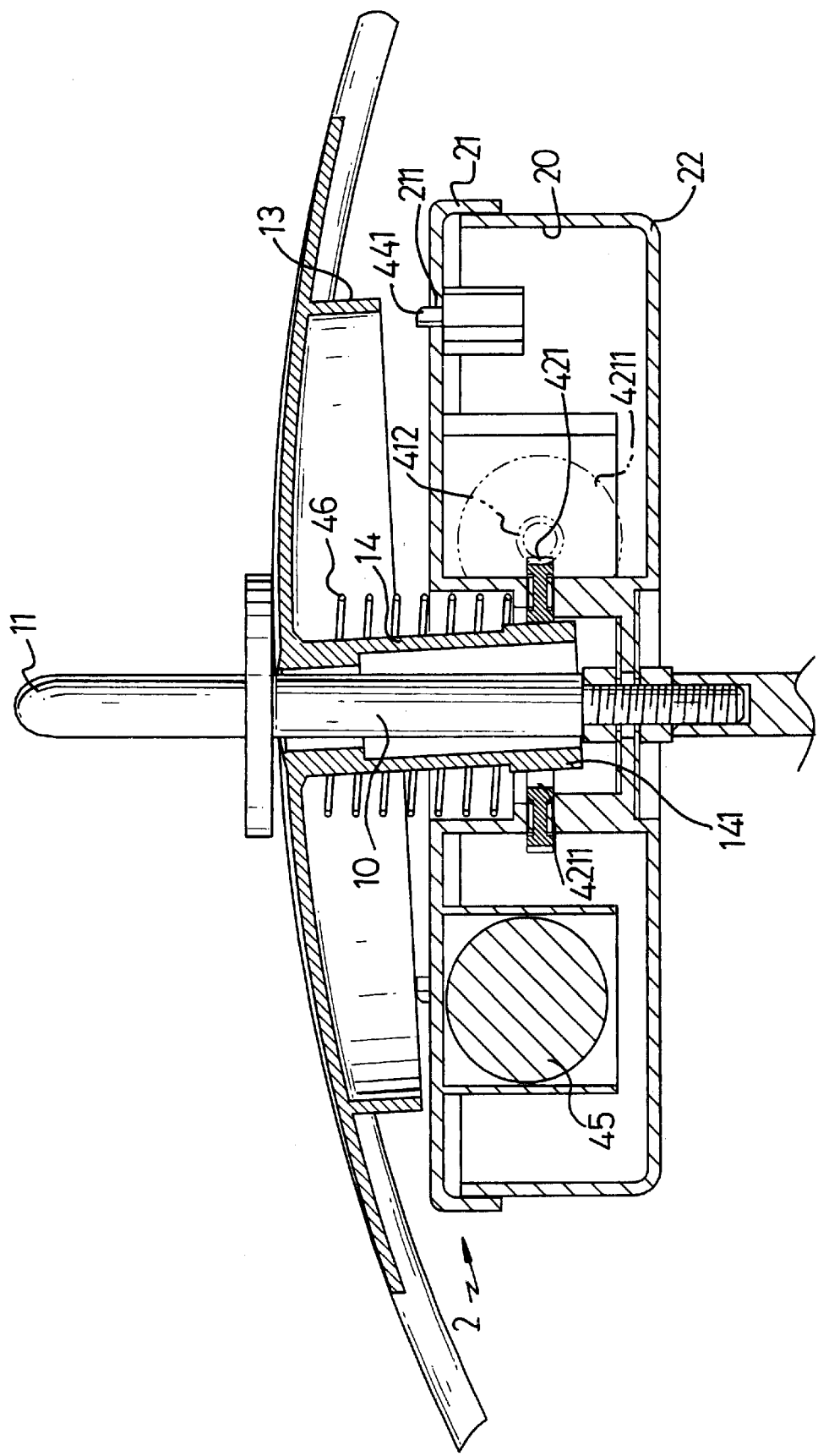
FIG. 4 is an operational schematic view showing how the electrical motor is triggered by the inclination of the repelling disk.

With reference to FIG. 4, when the foregoing elements are mounted in the housing (2) and a weight is alighted on the repelling disk (1), which inclines the repelling disk (1) with respect to the central shaft (10), the annular flange (13) is able to engage with one of the buttons (441). After one of the buttons (441) senses the engagement with the annular flange (13), the sensor (44) sends a signal to the controller (43) to initiate the electrical motor (41). The electrical motor (41) then drives the annular second bevel gear (421) to rotate due to the engagement between the first bevel gear (412) of the motor shaft (411) and the second bevel gear (421). Because the second bevel gear (421) is securely connected to the annular extension (14) of the repelling disk (1), the repelling disk (1) is able to be accordingly driven to rotate with respect to the housing (2).

However, when the weight alighting on the repelling disk (1) is removed, the failure of the engagement between the annular flange (13) with one of the buttons (441) stops the signal transmitting to the electrical motor (41) so that the rotation of the annular second bevel gear (421) stops, which also stops the rotation of the repelling disk (1). Further, after the removal of the added weight on the repelling disk (1), the spring (46) returns the repelling disk (1) to its original position.

According to the present invention, any rodent or animals that can not fly are not able to have the access to the food contained in the food container (3) and only birds can have the access to the food in the food container (3) by flying in the air.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A repelling device for a bird feeder having a food container, the repelling device comprising:
   a retainer having a bottom retainer adapted to detachably connect to the food container, a top retainer adapted to allow the bird feeder to be hung on an object and a central shaft adjoining the top and bottom retainers;
   a repelling disk rotatably and movably mounted around the central shaft and having an annular extension mounted around the central shaft of the retainer and an annular flange integrally formed on an inner face of the repelling disk and extending downward;
   a housing securely engaged with the central shaft to receive therein a driving device to selectively drive the repelling disk to rotate; and
   multiple sensors each securely mounted in the housing and partially extending out of the housing to be detachably engaged with the annular flange,
      whereby the repelling disk is selectively driven by the driving device to rotate when the repelling disk is moving toward the housing to allow the annular flange to engage with a corresponding one of the sensors.

2. The repelling device as claimed in claim 1 further comprising a spring clamped between the repelling disk and the housing to support weight of the repelling disk and provide a recovery force to the repelling disk after the repelling disk is moved toward the housing.

3. The repelling disk as claimed in claim 2, wherein the driving device comprises an electrical motor securely received in the housing to be electrically connected with the sensors and having a first bevel gear securely mounted on a distal end of a motor shaft extending out from the electrical motor, an annular second bevel gear securely engaged with the annular extension and meshed the first bevel gear.

4. The repelling device as claimed in claim 3, wherein the annular extension has a path defined in an inner face of the annular extension and the annular second bevel gear has a lug formed on an outer face of the annular second bevel gear to be securely received in the path so that the rotation of the annular second bevel gear is able to drive the repelling disk to rotate.

5. The repelling device as claimed in claim 3, wherein the driving device further has batteries received in the housing to provide electricity to the electrical motor.

6. The repelling device as claimed in claim 3, wherein each of the sensors has a button extending out of the housing to be selectively engaged with the annular flange.

7. The repelling device as claimed in claim 6 further comprising a controller to receive signals from the sensors to initiate rotation of the motor.

* * * * *